United States Patent [19]

Arima

[11] Patent Number: 5,486,325
[45] Date of Patent: Jan. 23, 1996

[54] SEAL MOLDING METHOD AND DEVICE

[75] Inventor: Hidetoshi Arima, Ohbu, Japan

[73] Assignee: Tokai Kogyo Co., Ltd., Aichi, Japan

[21] Appl. No.: 338,897

[22] Filed: Nov. 14, 1994

Related U.S. Application Data

[60] Continuation of Ser. No. 73,341, Jun. 7, 1993, abandoned, which is a division of Ser. No. 689,697, Apr. 19, 1991, Pat. No. 5,244,704.

[30] Foreign Application Priority Data

Apr. 27, 1990 [JP] Japan ..................... 2-112258

[51] Int. Cl.$^6$ .................................. B29C 47/22
[52] U.S. Cl. .............. 264/167; 264/171.26; 264/177.16; 264/209.8; 425/132; 425/381; 425/465
[58] Field of Search ............... 264/167, 209.8, 264/177.10, 177.16, 177.19, 209.3, 173; 425/380, 465, 461, 467, 132, 381

[56] References Cited

U.S. PATENT DOCUMENTS

| | | | |
|---|---|---|---|
| 4,313,327 | 2/1982 | O'Connor | 425/132 |
| 4,584,150 | 4/1986 | Ballocca | 264/167 |
| 4,655,987 | 4/1987 | Zertuche | 425/467 |
| 4,686,075 | 8/1987 | Dziewanowski et al. | 425/467 |
| 4,777,001 | 10/1988 | Kobayashi et al. | 264/177.19 |
| 4,911,873 | 3/1990 | Kuzuya et al. | 264/150 |
| 4,960,375 | 10/1990 | Saito et al. | 264/177.16 |
| 4,976,069 | 12/1990 | Arima et al. | 49/497 |
| 5,110,529 | 5/1992 | Arima | 264/177.16 |
| 5,162,090 | 11/1992 | Arima | 264/177.16 |
| 5,183,612 | 2/1993 | Suita et al. | 264/177.1 |

Primary Examiner—Jeffery R. Thurlow
Attorney, Agent, or Firm—Flynn, Thiel, Boutell & Tanis

[57] ABSTRACT

A method and device for molding a door seal, such as for an automobile. The device is provided with a first extrusion passage for extruding a molding material into a hollow portion of the door seal. A second extrusion passage is provided for extruding molding material into a bridge which spans across the hollow portion of the door seal. A molding material discharge member, such as a pipe, is movably inserted into the molding die and can be moved between open and closed positions relative to a molding material supply passage for permitting material to be intermittently extruded through the second passage, whereas material is substantially continuously extruded through the first passage, thereby permitting the bridge to be molded to the hollow portion at selected locations therealong.

6 Claims, 4 Drawing Sheets

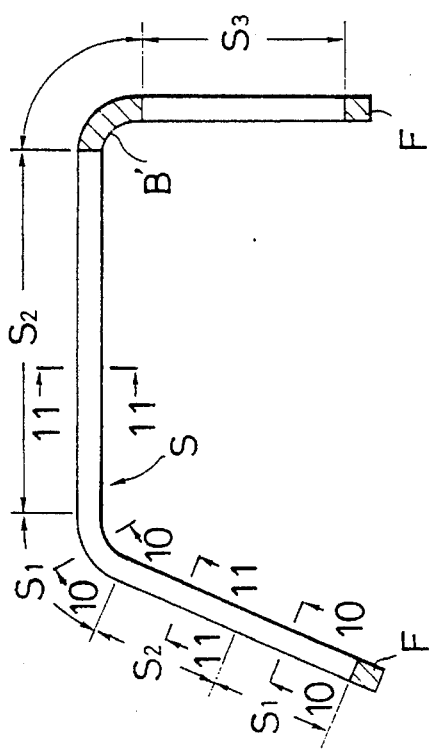
FIG. 9
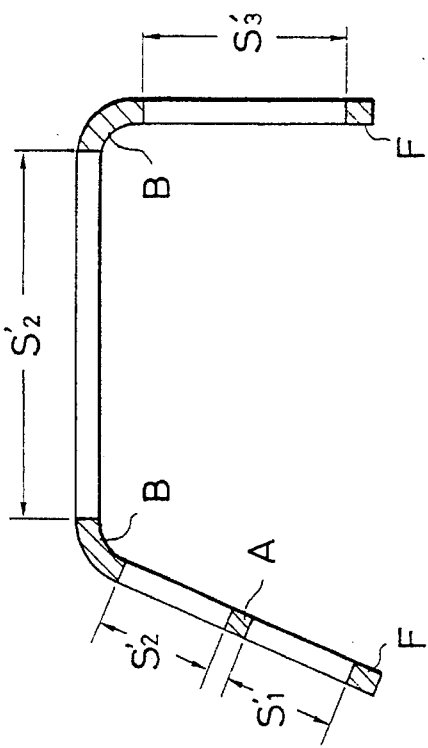
FIG. 13 PRIOR ART
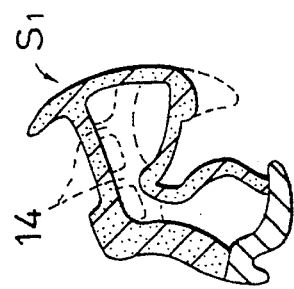
FIG. 12
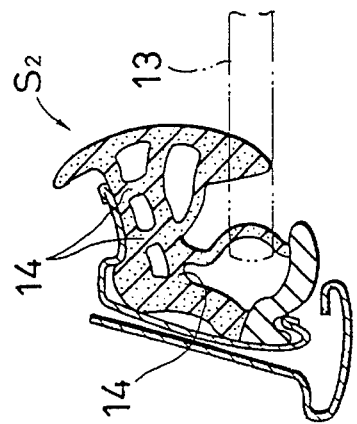
FIG. 11
FIG. 10

SEAL MOLDING METHOD AND DEVICE

This application is a continuation of U.S. Ser. No. 08/073,341, filed Jun. 7, 1993, now abandoned, which was a divisional of application Ser. No. 07/689,697, Apr. 19, 1991, now U.S. Pat. No. 5,244,704.

FIELD OF THE INVENTION

The present invention relates to a seal adapted to be mounted on an inner periphery of a door opening of a body of an automobile, so as to seal between the inner periphery of the opening and an outer periphery of a door upon closing the door. The present invention also relates to a molding method and device for such a seal.

BACKGROUND OF THE INVENTION

A hollow door seal for an automobile (hereinafter referred to simply as a door seal) includes a part provided with a bridge in a hollow portion and a part provided with no bridge in the hollow portion, depending on the mounting position of the door seal.

In an automobile of a hard-top type mounting a door mirror thereon, for example, the door seal is formed by connecting three kinds of door seal parts as shown in FIG. 13 That is, three kinds of door seal parts $S'_1$, $S'_2$ and $S'_3$ having different sectional shapes are independently formed. The door seal part $S'_1$ and the door seal part $S'_2$, both constituting a straight front side portion of the door seal where the door mirror is located, are bonded together at a connecting portion A. Further the door seal part $S'_2$ constituting the front side portion and the door seal part $S'_2$ constituting an upper side portion of the door seal are corner-molded and connected together at a connecting portion B. The door seal part $S'_2$ constituting the upper side portion and the door seal part $S'_3$ constituting a rear side portion of the door seal are also corner-molded and connected together at a connecting portion B'.

The door seal part $S'_1$ to be mounted at a position where the door mirror is located has no bridge in the hollow portion, so as to reduce the seal reaction generated due to deformation when the door mirror contacts the door seal part $S'_1$, and thereby ensuring ready fitting of the door mirror with the door seal part $S'_1$. In contrast, the door seal part $S'_2$ mounted at a position where a window glass of the door is located has a bridge in the hollow portion, so as to generate a large seal reaction and thereby ensure a high sealability when the window glass comes into contact with the door seal part $S'_2$. Further, the connecting portion B at the front corner of the door seal is formed of a seal member having the same structure as that of the door seal part $S'_1$. That is the connecting portion B has no bridge in the hollow portion. Further, lower ends F of the door seal parts $S'_1$ and $S'_3$ are end-molded As mentioned above, the conventional door seal for an automobile mounting a door mirror thereon employs three kinds of door seal parts, and requires corner-molding at two positions and straight-bonding at one position. Accordingly, the number of manufacturing steps in the molding operation is increased, and the connecting portions are visibly perceived to deteriorate the appearance.

It is accordingly an object of the present invention to eliminate the connecting portions by integrally forming a first seal portion having no bridge in the hollow portion and a second seal portion having a bridge in the hollow portion by continuous molding.

According to the present invention for achieving the above object, there is provided a molding method for a seal for an automobile, comprising the steps of separately forming a first extrusion passage for extruding a molding material into a hollow portion of said door seal and a second extrusion passage for extruding a molding material into a bridge in the hollow portion of said seal in an extrusion opening of a molding die with use of a core, axially moving a molding material discharge pipe inserted into said molding die, and repeatedly closing and opening a molding material supply passage communicated with said second extrusion passage so as to intermittently extrude the molding material from said second extrusion passage.

The material to be molded into the body portion of the seal is continuously extruded. However, the material to be molded into the bridge in the hollow portion of the seal is intermittently extruded from the second extrusion passage by repeating the closing and opening of the molding material supply passage as communicated with the second extrusion passage by axial movement of the molding material discharge pipe. Accordingly, the first seal portion having no bridge in the hollow portion and the second seal portion having the bridge in the hollow portion can be continuously molded.

As a result, the connecting portion between the first and second seal portions can be eliminated to thereby improve the appearance. Further, the number of manufacturing steps for the connection between the seal parts necessary in the prior art method can be eliminated to thereby improve the productivity.

BRIEF DESCRIPTION OF THE DRAWINGS

FIGS. 1 to 12 are illustrations for explaining the present invention.

FIG. 1 is a front elevational view of a molding device to be used in molding the first hollow molding part $E_1$;

FIG. 2 is a cross section taken along the line 2—2 in FIG. 1;

FIG. 3 is a view similar to FIG. 2, and shows a device for molding the second hollow molding part $E_2$;

FIG. 4 is a perspective view of the molding material discharge pipe P;

FIG. 8 is a perspective view of the hollow molding E formed according to the present invention;

FIG. 9 is a side view of a door seal S formed according to the present invention;

FIG. 10 is a cross section taken along the line 10—10 in FIG. 9;

FIG. 11 is a cross section taken along the line 11—11 in FIG. 9;

FIG. 12 is a sectional view of the first seal portion $S_1$ having no bridges 14 as shown by a dashed line; and FIG. 13 is a side view of a door seal formed by the conventional molding method.

DETAILED DESCRIPTION

There will first be described the molding method according to the present invention with reference to FIGS. 1 to 7.

Figure 5A:
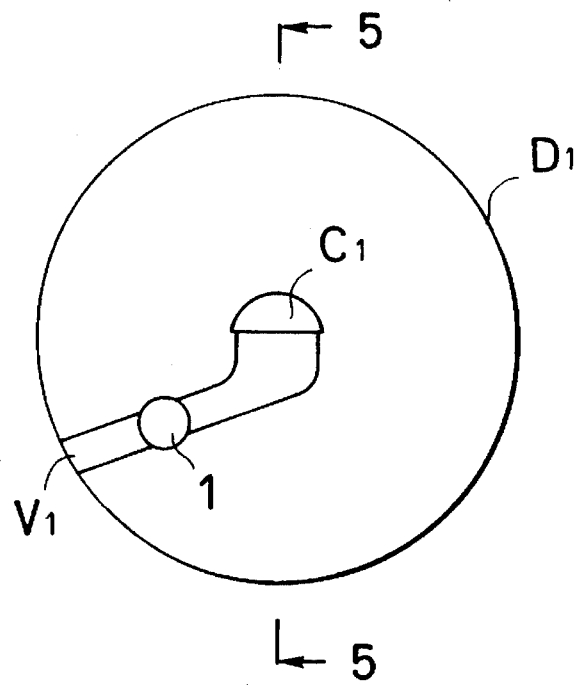
FIG. 5(a) is a front elevational view of the first die $D_1$.
Figure 5B:
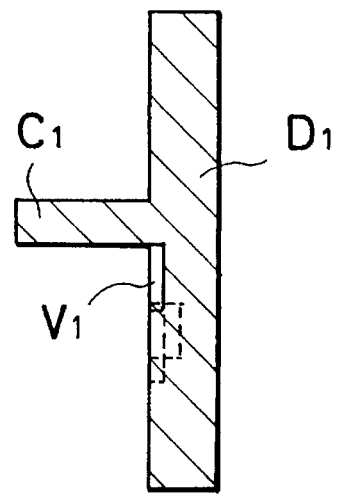
FIG. 5(b) is a cross section taken along the line 5—5 in FIG. 5(a)

A molding die D is constructed by overlapping first, second and third die parts $D_1$, $D_2$ and $D_3$. As shown in FIGS. 5(a) and 5(b), the first die part $D_1$ is formed substantially as a cylindrical-shaped plate or disk provided at its central portion with a first core $C_1$ having a semicircular cross section and projecting outwardly from a front surface of the die part $D_1$. The first die part $D_1$ is further formed on its front surface with a molding material supply passage or groove $V_1$ extending from an outer circumference of the front surface to the first core $C_1$. The supply passage $V_1$, intermediate the ends thereof, is formed with a recess 1 for receiving a base end of a molding material discharge pipe P which will be hereinafter described. The recess 1 is formed substantially as a blind cylindrical bore having an axial depth greater than that of the passage $V_1$. The supply passage $V_1$ serves as a passage for supplying a molding material to be molded into a bridge 4 in a hollow portion 3 of a hollow molding E.

Figure 6A:
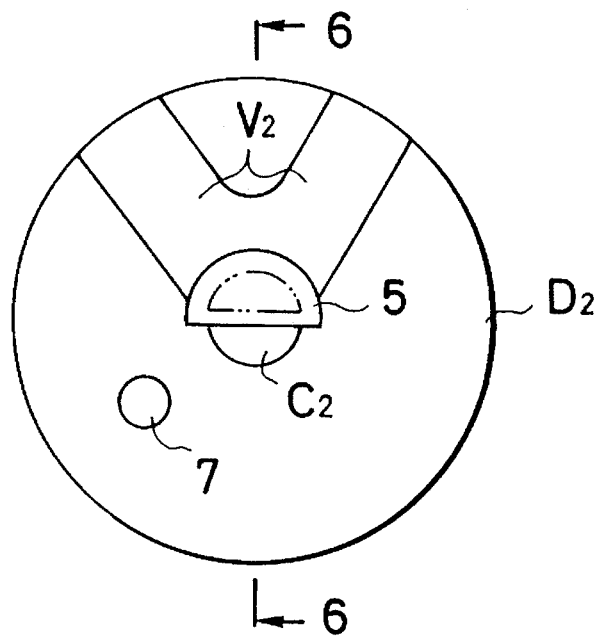
FIG. 6(a) is a front elevational view of the second die $D_2$.
Figure 6B:
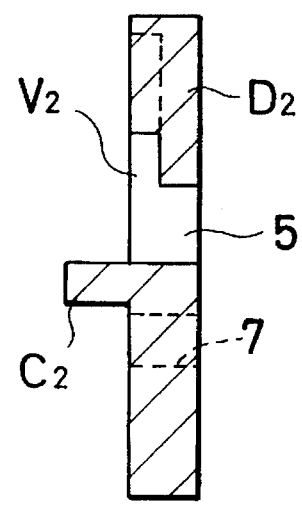
FIG. 6(b) is a cross section taken along the line 6—6 in FIG. 6(a)

As shown in FIGS. 6(a) and 6(b), the second die part $D_2$ is also formed substantially as a cylindrical-shaped plate or disk provided at its central portion with a second core $C_2$ having a semicircular cross section and projecting outwardly from a front surface of the die part $D_2$. An extrusion opening 5 having a semicircular cross section is formed axially through the second die part $D_2$ at a position adjacent to the second core $C_2$. The second die part $D_2$ is further formed on its front surface with a molding material supply passage or groove $V_2$ extending from an outer circumference of the front surface to the extrusion opening 5. The first core $C_1$ of the first die part $D_1$ is symmetrical with the second core $C_2$ of the second die part $D_2$ with respect to the axially aligned centers of the die parts $D_1$ and $D_2$ after they are overlapped. The supply passage $V_2$ serves as a passage for supplying a molding material to be molded into an upper half of a body portion 2 of the hollow molding E.

Figure 7A:
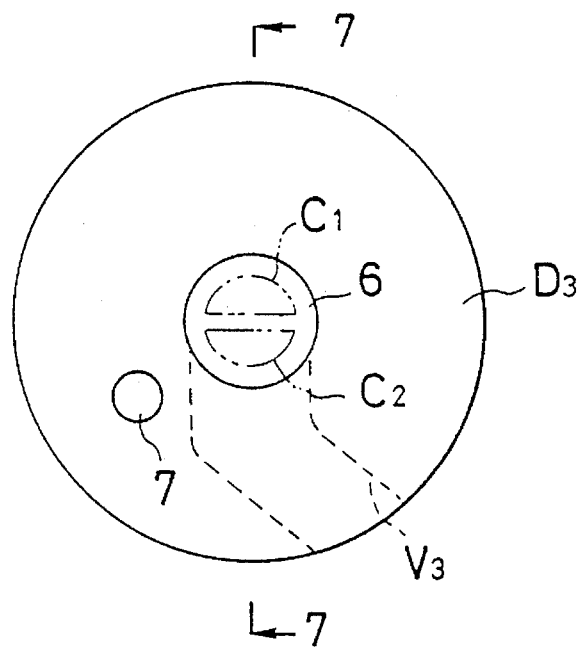
FIG. 7(a) is a front elevational view of the third die $D_3$.
Figure 7B:
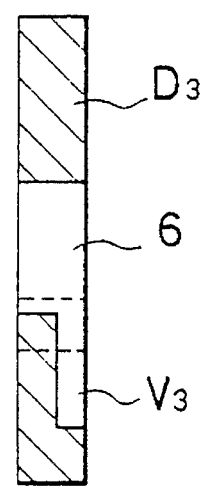
FIG. 7(b) is a cross section taken along the line 7—7 in FIG. 7(a)

As shown in FIGS. 7(a) and 7(b), the third die part $D_3$ is formed as a cylindrical-shaped plate or disk provided at its central portion with an extrusion opening 6 having a circular cross section and extending coaxially therethrough. The third die part $D_3$ is further formed on its rear surface with a molding material supply passage or groove $V_3$ extending from an outer circumference of the rear surface to the extrusion opening 6. The supply passage $V_3$ serves as a passage for supplying a molding material to be molded into a lower half of the body portion 2 of the hollow molding E.

Both the second and third die parts $D_2$ and $D_3$ are formed with aligned pipe insert holes 7 extending axially therethrough for inserting the molding material discharge pipe P therethrough.

The molding die D is assembled by inserting the first core $C_1$ of the first die part $D_1$ into the extrusion openings 5 and 6 of the second and third die parts $D_2$ and $D_3$, inserting the second core $C_2$ of the second die part $D_2$ into the extrusion opening 6 of the third die part $D_3$ to thereby overlap the first, second and third die parts $D_1$, $D_2$ and $D_3$ together, and thereafter inserting the molding material discharge pipe P into the pipe insert holes 7 of the second and third die parts $D_2$ and $D_3$.

Figure 4:
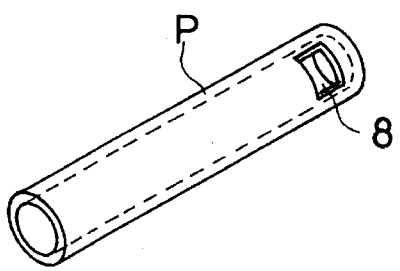

As shown in FIG. 4, the molding material discharge pipe P is closed at one end thereof, and is formed with a radially-directed opening 8 in the pipe sidewall near the closed end.

Figure 1:
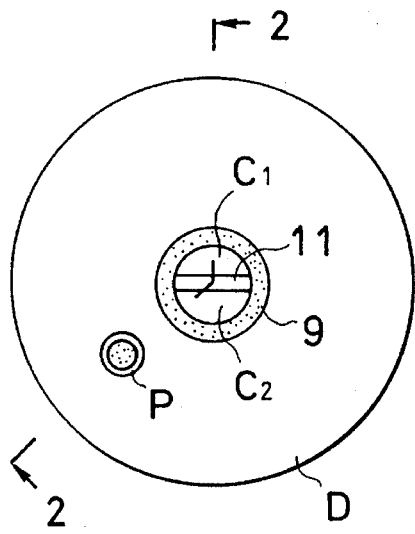
Figure 2:
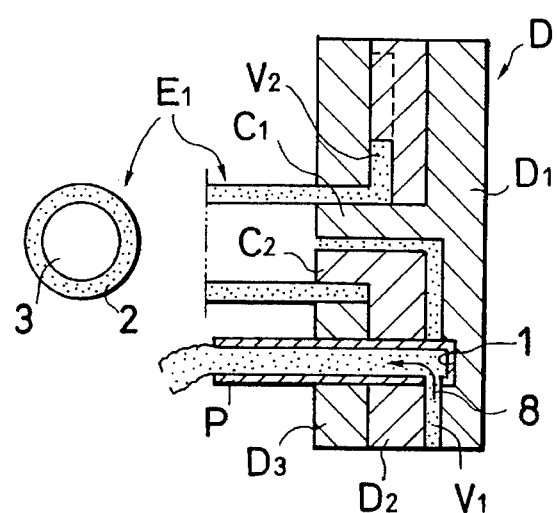

Under the assembled condition of the molding die D as shown in FIGS. 1 and 2, an annular extrusion passage 9 for extruding the molding material to be molded into the body portion 2 of the hollow molding E is defined between the outer circumferential semicircular surfaces of the first and second cores $C_1$ and $C_2$ and the inner circumferential circular surface of the extrusion opening 6. Further, another extrusion passage 11 for extruding the molding material to be molded into the bridge 4 of the hollow molding E is defined between the spaced but flat opposed surfaces of the first and second cores $C_1$ and $C_2$.

When the closed end of the molding material discharge pipe P is engaged against the bottom of the recess 1 formed in the first die part $D_1$, the pipe P thus fully closes the supply passage $V_1$, as shown in FIGS. 1 and 2. Thus, the molding material supplied through the supply passages $V_2$ and $V_3$ is continuously extruded from the extrusion passage 9, thereby molding the outer wall 2 of the hollow molding E. However, as the supply passage $V_1$ is closed midway thereof by the discharge pipe P, the molding material supplied to the outer end of the supply passage $V_1$ enters the discharge pipe P through the opening 8 thereof, and is discharged through the open end of the discharge pipe P to the outside. As a result, a first hollow molding part $E_2$ having no bridge 4 in the hollow portion 3 is extrusion-molded.

Figure 3:
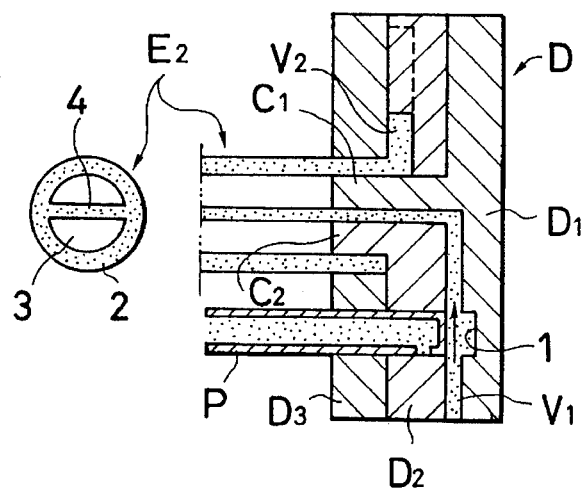

Thereafter, when the molding material discharge pipe P is moved axially to open the supply passage $V_1$ as shown in FIG. 3, the molding material supplied to and through the supply passage $V_1$ is continuously extruded from the extrusion passage 11, thereby molding the bridge 4 of the hollow molding. As a result, a second hollow molding part $E_2$ having the bridge 4 in the hollow portion 3 is extrusion-molded. The molding lengths of the first and second hollow molded parts $E_1$ and $E_2$ can be defined by controlling a closed time and an open time of the supply passage $V_1$ by the operation of the molding material discharge pipe P.

Figure 8:
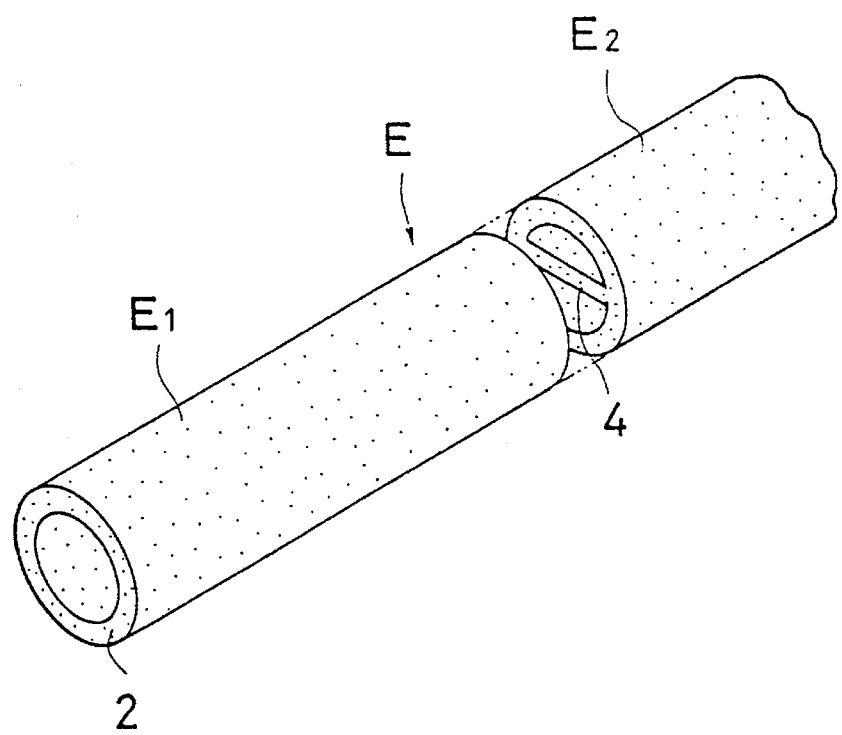

In this manner, by repeating the closing and the opening of the supply passage $V_1$ of the first die part $D_1$ by the operation of the discharge pipe P with a predetermined time period, the first hollow molded part $E_1$ having no bridge 4 in the hollow portion 3 and the second hollow molded part $E_2$ having the bridge 4 in the hollow portion 3 are continuously formed as shown in FIG. 8.

It is to be noted that the above description has been directed to the principle of the molding method according to the present invention. In an actual molding operation, an extrusion molding is drawn by a predetermined tension. Accordingly, in order to avoid that the molding is deformed by the tension because of a change in cross sectional area of the molding, it is necessary to embed a core member such as a thin metal sheet or a thread in the molding, or carry out two-color extrusion molding using two kinds of molding materials having different hardnesses, wherein the bridge is formed of the material having a small hardness.

FIGS. 9 to 12 show a door seal S formed by utilizing the above principle. As shown in FIG. 10, a first seal portion $S_1$ having no bridge is employed in an area where a door mirror 12 is located, while as shown in FIG. 11, a second seal portion $S_2$ having a plurality of bridges 14 is employed in an area where a window glass 13 is located, so that the second seal portion $S_2$ is required to tightly contact the window glass 13 by a large seal reaction. Further, the first seal portion $S_1$ is also employed at a corner area between a front side portion and an upper side portion of the seal S, so that the seal portion $S_1$ may be readily deformed with a reduced seal reaction. According to the molding method of the present invention, the first and second seal portions $S_1$ and $S_2$ can be alternately and continuously formed to obtain the seal S. Therefore, in comparison with the conventional molding method, the connection at the corner portion between the front side portion and the upper side portion of the seal S can be eliminated, and the bonding of the first seal portion $S_1$ and the second seal portion $S_2$ in the straight front side portion of the seal S can also be eliminated. As a result, the number of manufacturing steps can be largely reduced to thereby remarkably improve the productivity.

Further, as shown in FIG. 12, five cores are required for the molding of the seal S in this preferred embodiment.

According to the present invention, the first seal portion having no bridge in the hollow portion and the second seal portion having the bridge in the hollow portion can be continuously molded. Accordingly, the connection between the first and second seal portions are eliminated to thereby improve the appearance. Moreover, the corner molding necessary in the conventional molding method can be eliminated to thereby largely reduce the number of manufacturing steps, resulting in remarkable improvement in the productivity.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A molding method for a seal comprising the steps of forming a first extrusion passage using a core disposed in an extrusion opening of a molding die for extruding a molding material to be molded into a hollow portion of said seal, supplying molding material to the first extrusion passage by a first molding material supply passage to continuously mold said hollow portion, forming a separate second extrusion passage in said extrusion opening for extruding a molding material to be molded into a bridge in the hollow portion of said seal, moving a molding material discharge pipe inserted into said molding die relative to a second molding material supply passage disposed in the molding die communicated with said second extrusion passage so as to intermittently supply molding material to said second extrusion passage independently of supply of molding material to said first extrusion passage so that the molding material is intermittently extruded from said second extrusion passage, whereby a first seal portion having no bridge in said hollow portion and a second seal portion having said bridge in said hollow portion are continuously molded.

2. A molding device for a seal comprising a molding die having an extrusion opening, a core disposed in said extrusion opening for defining a first extrusion passage for a seal, a first molding material supply passage communicated to said first extrusion passage, a second extrusion passage in the molding die for extruding a molding material to be molded into a bridge of said seal, a molding material flow control member movably mounted on said molding die relative to a second molding material supply passage in the molding die independently communicated to said second extrusion passage, said second molding material supply passage being closed and opened relative to said second extrusion passage by movement of said molding material flow control member.

3. A device according to claim 2, wherein the die includes a first die member having said extrusion opening extending therethrough, a second die member engaged with said first die member and having a first protrusion thereon which projects into and substantially through said extrusion opening, a third die member engaged with said second die member and having a second protrusion thereon which projects into and substantially through said extrusion opening in close proximity to said first protrusion, said first and second protrusions having opposed surfaces which define said second extrusion passage therebetween, said first and second protrusions defining thereon exterior surfaces which cooperate with an inner wall defining said extrusion opening to define said first extrusion passage therebetween, said first extrusion passage being of generally annular configuration and internally bridged by said second extrusion passage, said die defining a first material supply passage which communicates solely with said first extrusion passage, said die defining a second material supply passage which communicates solely with said second extrusion passage, and said flow control member having a flow-interrupting portion movably mounted on said die and cooperating with said second material supply passage for selectively interrupting flow of molding material therethrough.

4. A device according to claim 3, wherein said flow control member includes means associated therewith for permitting, when in a closed position, molding material as supplied to said second supply passage to be diverted away from said second extrusion passage so as to permit continuous supply of material to said second supply passage even when said second extrusion passage is closed.

5. A device according to claim 4, wherein said flow control member is hollow and defines therein a diversion passage for permitting material to flow into and through the diversion passage when the flow control member is in the closed position.

6. A device according to claim 5, wherein said flow control member comprises an elongate hollow pipe which is slidably supported on said die for movement between open and closed positions relative to said second material supply passage.

* * * * *